United States Patent [19]

Leon

[11] Patent Number: 4,695,443

[45] Date of Patent: Sep. 22, 1987

[54] AUTOTHERMAL PROCESS FOR THE PRODUCTION OF CARBON DISULFIDE AND HYDROGEN SULFIDE

[75] Inventor: Albert M. Leon, Mamaroneck, N.Y.

[73] Assignee: Stauffer Chemical Company, Westport, Conn.

[21] Appl. No.: 701,841

[22] Filed: Feb. 14, 1985

[51] Int. Cl.$^4$ .................. C01B 31/26; C01B 17/16
[52] U.S. Cl. .................. 423/443; 423/444; 423/561 R; 423/563; 423/565; 423/DIG. 16
[58] Field of Search .................. 423/444, 443, 561 R, 423/563, 565, 444, DIG. 16

[56] References Cited

U.S. PATENT DOCUMENTS

| | | | |
|---|---|---|---|
| 1,350,858 | 8/1920 | Dow et al. | 423/444 |
| 1,369,825 | 3/1921 | McElroy | 423/444 |
| 2,480,639 | 8/1949 | Ferguson | 423/444 |
| 2,487,039 | 11/1949 | Belchetz | 423/444 |
| 2,728,638 | 12/1955 | Morningstar | 423/444 |
| 2,789,037 | 4/1957 | Kimberlin et al. | 423/444 |

Primary Examiner—John Doll
Assistant Examiner—Jackson Leeds

[57] ABSTRACT

There is disclosed a process for the production of carbon disulfide and hydrogen sulfide from a particulate carbon source. In one embodiment, an oxygen containing gas is reacted with a particulate carbon source in a one step process so as to provide the temperatures necessary for the reaction of the particulate carbon source with sulfur to produce carbon disulfide. In another embodiment, a source of hydrogen is introduced along with the oxygen containing gas and sulfur so as to produce hydrogen sulfide in a single step process.

7 Claims, 4 Drawing Figures

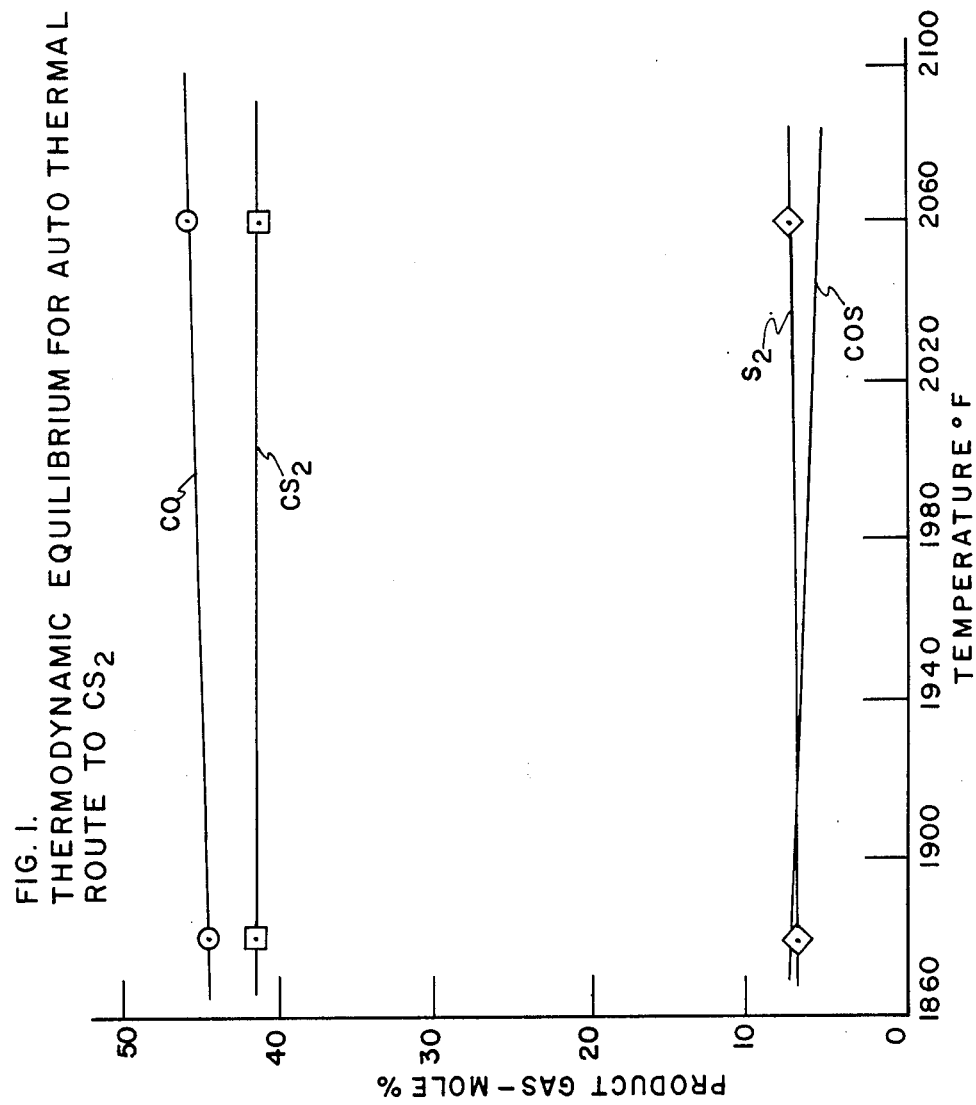

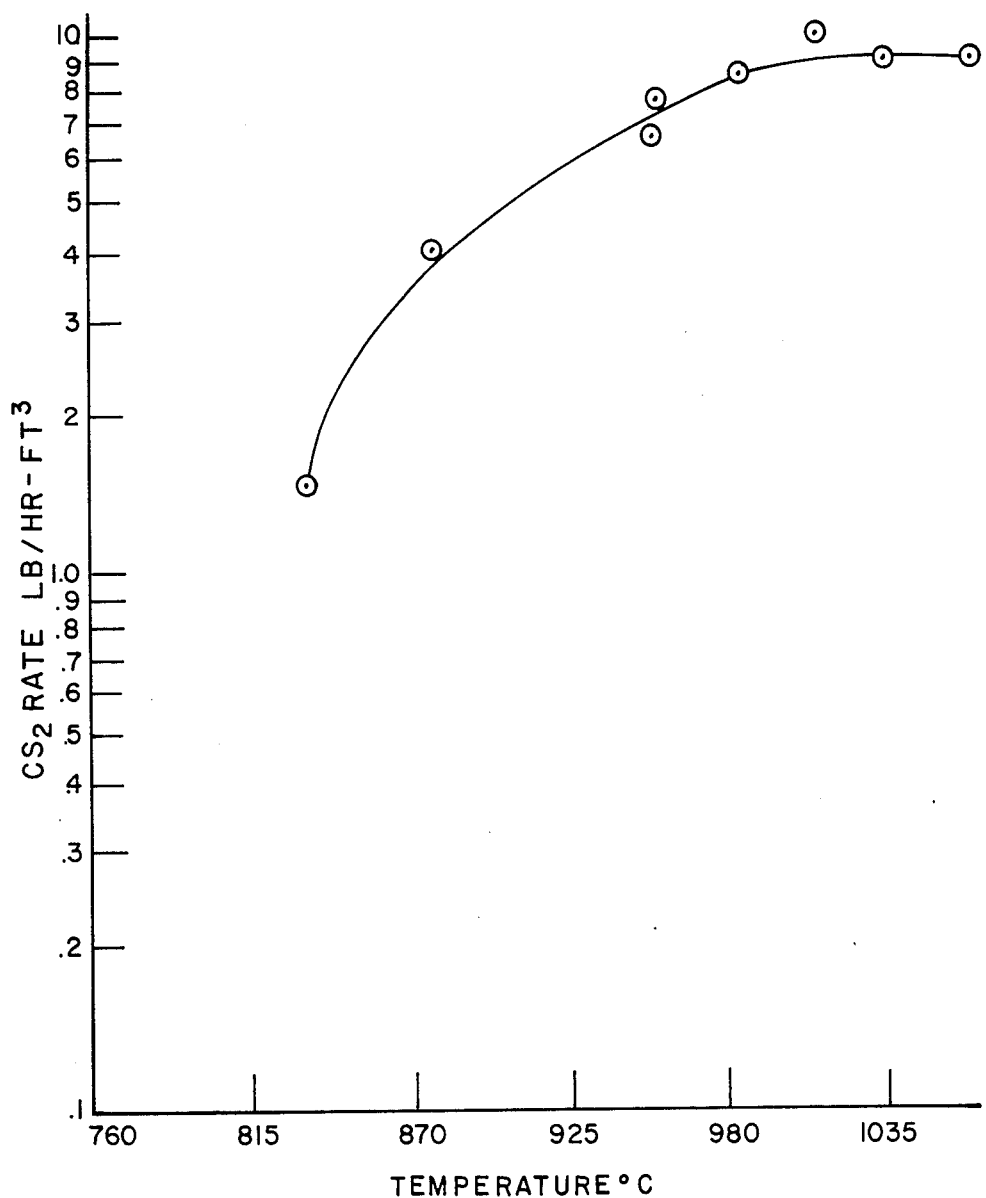

AUTOTHERMAL PROCESS FOR THE PRODUCTION OF CARBON DISULFIDE AND HYDROGEN SULFIDE

FIELD OF THE INVENTION

The present invention relates to a novel process for the production of carbon disulfide and hydrogen sulfide from elemental sulfur and a particulate carbon source. More particularly, the present invention relates to a novel process for the production of carbon disulfide and hydrogen sulfide wherein the temperatures necessary to drive the reaction are provided autogenously.

BACKGROUND OF THE INVENTION

Carbon disulfide has been an important industrial chemical since the nineteenth century. The principal uses of this compound are in the manufacture of regenerated cellulose fibers and films, as a raw material for the manufacture of carbon tetrachloride, as an intermediate in the production of various organic sulfur compounds, and as an organic solvent.

Two methods have been used for the production of carbon disulfide. In one method, a hydrocarbon, particularly in the form of a gas such as methane, ethane or propane, is reacted with sulfur vapors at elevated temperatures in the range of from 600° C. to 750° C. Variations on this basic technique can be found, for example, in U.S. Pat. Nos. 2,809,097, 2,568,121, 2,330,934, 2,492,719 and 2,630,373.

The other method for the production of carbon disulfide involves reacting a solid carbon source with sulfur vapor. When these solid carbon sources are used, the reaction is usually carried out in an externally fired retort wherein sulfur is vaporized and superheated and the reaction between the carbon and sulfur takes place in a reaction vessel containing carbon located on the top of the retort. Internal heat sources also have been used. The preferred solid carbon source has been charcoal although other forms of solid carbon, including lignite, lignite chars, pulverized coal and brown coal semicokes can be used. See, for example, British Pat. No. 705,724 and U.S. Pat. No. 3,402,021.

There has also been a considerable amount of interest in using petroleum coke as a carbon source in this process For instance, U.S. Pat. No. 2,789,037 discloses the use of petroleum coke prepared by the fluid coking process as a solid carbon source for the production of carbon disulfide. The process disclosed in this patent requires a low temperature oxidation pretreatment of the fluid coke used.

In U.S. Pat. No. 2,443,854, there is disclosed a process for the production of carbon disulfide wherein a portion of the powdered carbon is burned to provide the heat necessary for the formation of carbon disulfide. The above patent discloses a reaction chamber comprised of three sections wherein the combustion of the powdered carbon takes place in one section, the vaporized sulfur is fed upwardly so as to react with the combusted powdered carbon in the second section and the carbon disulfide formed is then passed out of this section.

In U.S. Pat. No. 3,034,863, there is disclosed a fluid bed process in which the heat necessary to drive the reaction is supplied from an external source.

In U.S. Pat. No. 2,708,156, an electric furnace for the treatment of petroleum coke is disclosed.

A fluidized bed process for the production of carbon disulfide is also disclosed in U.S. Pat. No. 2,480,639. In the process disclosed in the above patent, the heat for the reaction of carbon and sulfur to produce carbon disulfide is produced by feeding an excess of carbon to the reaction zone, recovering excess unreacted carbon from the reaction zone and recirculating the same to the carbon preheating stage to supply a source of heat for the fresh carbon feed. In another section of the apparatus disclosed in the above patent, a portion of the coke is burned to provide the heat necessary for the carbon disulfide forming reaction.

Both of the above methods do have their respective disadvantages. The recent unavailability of gaseous hydrocarbons has made the use of these compounds as carbon sources in a carbon disulfide production process a rather expensive proposition. Similarly, the high energy costs associated with the internal or external, particularly through electrothermal means, generation of the high temperatures necessary when a solid carbon source is used have also led to increased costs for the use of this process.

Techniques for the production of hydrogen sulfide are also well known (see Kirk-Othmer, Encyclopedia of Chemical Technology, Vol. 22, pp. 114–121). One principal use of this compound is in the preparation of inorganic sulfides.

SUMMARY OF THE INVENTION

In accordance with the present invention, there is disclosed one embodiment of the present invention comprising a process for the production of carbon disulfide from a solid carbon source and sulfur wherein the temperatures necessary to drive the reaction are provided autogenously. In this embodiment of the invention, oxygen and sulfur are used to create a fluidized bed with the carbon source. The exothermic reaction of the oxygen with the carbon source produces the temperature necessary to drive the reaction. By careful controlling of the sulfur/oxygen ratio and other operating conditions, the reaction is driven in favor of the production of carbon disulfide.

The process of the present invention allows the use of carbonaceous material from a wide variety of sources, such as coke, pitch coke, semi-coke, petroleum coke and charcoal. In addition, particulate carbon sources produced from a mixture of the aforesaid carbonaceous materials can also be employed in the present invention.

The sulfur containing gases generated from the reaction of the solid carbon source plus sulfur vapor under the conditions hereinbefore described are then subjected to a variety of quenching, condensing, cooling, reheating and purification procedures until the desired carbon disulfide is recovered in a pure form. Any effluent sulfur-containing gases such as, for example, unreacted sulfur vapor, hydrogen sulfide, etc., flow to a purification unit, such as a Claus unit, AQUACLAUS unit (e.g., see U.S. Pat. No. 3,911,093 to F. G. Sherif et al.) or other similar unit well known to those skilled in the art, wherein the effluent gases are treated accordingly.

In addition, the present invention also provides means for the flow of any carbonyl sulfide containing gases to a catalytic disproportionation reaction unit wherein the carbonyl sulfide containing gases are converted to additional carbon disulfide.

The present invention is also characterized by an embodiment in which there are provided means for the regenerated sulfur to be recycled to either the quenching or vaporizing means.

Additionally, the present invention also discloses a one step process for the production of hydrogen sulfide wherein a source of hydrogen is introduced into the reaction vessel with the carbon, oxygen and sulfur. Further embodiments and details of the invention can be found in the Detailed Description of the Invention which follows.

BRIEF DESCRIPTION OF THE DRAWINGS

FIG. 1 is an equilibrium diagram of mole percent of carbon disulfide versus temperature in a gas product mixture.

FIG. 1A is a graphic representation of the reaction conditions resulting in equilibrium concentrations of $CS_2$.

DETAILED DESCRIPTION OF THE INVENTION

Figure 2:
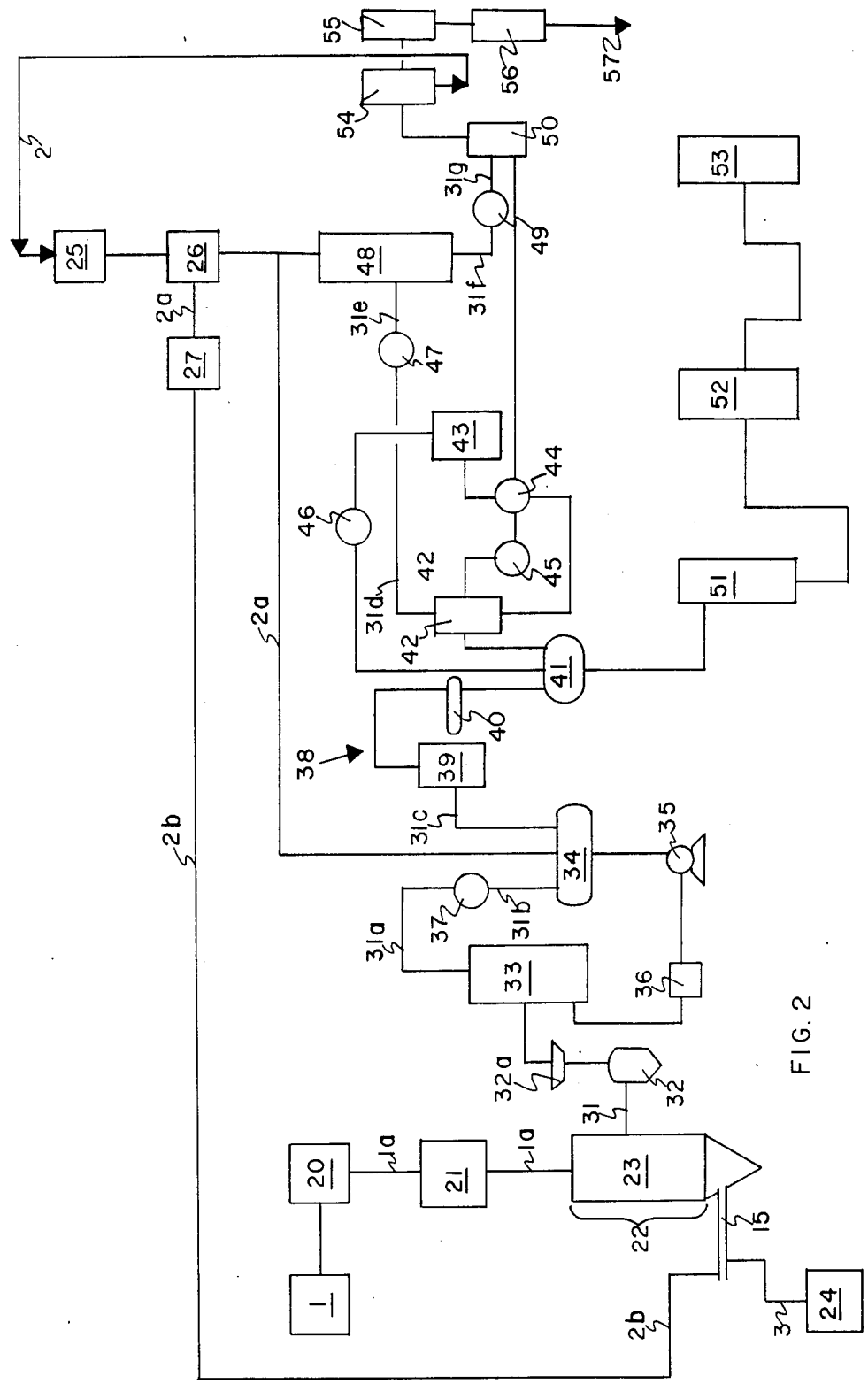
FIG. 2 represents a process scheme according to which the method of the present invention may be conducted.

In one embodiment, the present invention relates to a process for the production of carbon disulfide from a solid carbon source and a source of sulfur vapor wherein the temperatures necessary to drive the reaction are generated autogenously. By "autogenously" is meant an autothermal process in which the temperatures necessary to drive the reaction are generated by the reactants. The autothermal process of the present invention is characterized by the addition of a stream of oxygen and sulfur gas to the solid carbon source so as to create a fluidized bed.

In addition to providing the fluidizing gas, the oxygen is also a key reactant since the reaction of carbon and oxygen is exothermic and provides the heat necessary to maintain the reaction at the temperature required for the reaction of carbon with sulfur. The heat liberated by the reaction of carbon with oxygen heats the reactants to reaction temperature and makes up for heat losses. The reactions and heats of reaction are:

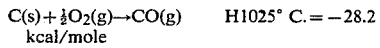
$$C(s) + \tfrac{1}{2}O_2(g) \rightarrow CO(g) \quad H1025^\circ C. = -28.2 \text{ kcal/mole}$$

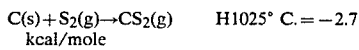
$$C(s) + S_2(g) \rightarrow CS_2(g) \quad H1025^\circ C. = -2.7 \text{ kcal/mole}$$

Thus, it will be appreciated that the exothermic reaction of carbon and oxygen generates enough heat to heat the carbon and sulfur reactants to the desired reaction temperature, thus compensating for any heat losses in the system.

Oxygen and sulfur gases are reacted with the carbon source under reaction conditions so as to produce a dispersion of the carbon source in a "fluidized" condition. By this term is meant that the mixture acts in many ways like a liquid since it is capable of flowing through pipes, valves, chambers and conduits and shows both static and dynamic heads. This technique of fluid solids circulation is well known and is described broadly in U.S. Pat. No. 2,689,124.

In order to insure production of equilibrium concentrations of carbon disulfide, the reaction conditions must be carefully controlled. One operating condition of major concern is the sulfur/oxygen ratio. Other operating conditions include reaction vessel temperature and superficial velocity values. The following examples illustrate the development of these operating parameters.

COMPARISON EXAMPLE 1

This example illustrates the results of fluidizing the bed with $SO_2$ as the oxygen and sulfur source, varying the temperature and the superficial velocity.

| Feed | $SO_2$ | $SO_2$ | $SO_2$ |
|---|---|---|---|
| Bed temp. - °C. | 1020 | 1070 | 1080 |
| Superficial Velocity - m/sec. | 0.07 | 0.07 | 0.06 |
| Contact time - sec. | 3.5 | 3.5 | 4.4 |
| Product Gases - Mole % | | | |
| $H_2$ | trace* | trace | trace |
| $O_2$ | trace | 0.03 | 0.02 |
| $N_2$ | 0.62 | 0.49 | 0.48 |
| CO | 52.98 | 46.75 | 52.88 |
| $CO_2$ | 7.76 | 8.31 | 4.37 |
| COS | 32.66 | 35.46 | 30.95 |
| $H_2S$ | trace | trace | trace |
| $CS_2$ | 5.98 | 8.96 | 11.30 |
| $SO_2$ | 0.00 | 0.00 | 0.00 |
| $COS/CS_2$ ratio | 5.5 | 4.0 | 2.7 |

*Trace amounts are less than 0.01%.

As can be seen, the highest product concentrations of $CS_2$ are obtained at elevated temperatures and contact times exceeding 3.5 seconds.

COMPARISON EXAMPLE 2

This example shows the effect of fluidizing the carbon source using COS as both an oxygen source and a source of sulfur, and using temperatures between 1020° C. and 1090° C.

| Feed | COS | COS | COS | COS | COS |
|---|---|---|---|---|---|
| Bed Temp. - °C. | 1020 | 1070 | 1080 | 1090 | 1070 |
| Velocity - m/sec | 0.07 | 0.07 | 0.06 | 0.07 | 0.06 |
| Contact time - sec. | 3.5 | 3.5 | 4.4 | 3.5 | 4.4 |
| Product gases - mole % | | | | | |
| $H_2$ | trace | trace | trace | trace | trace |
| $O_2$ | trace | 0.03 | 0.02 | 0.14 | 0.04 |
| $N_2$ | 0.62 | 0.49 | 0.48 | 0.97 | 0.71 |
| CO | 52.98 | 46.75 | 52.88 | 72.78 | 70.74 |
| $CO_2$ | 7.76 | 8.31 | 4.37 | 1.79 | 0.73 |
| COS | 32.66 | 35.46 | 30.95 | 13.48 | 11.20 |
| $H_2S$ | trace | trace | trace | 0.74 | 0.58 |
| $CS_2$ | 5.98 | 8.96 | 11.30 | 10.10 | 16.00 |
| $SO_2$ | 0.00 | 0.00 | 0.00 | 0.00 | 0.00 |
| $COS/CS_2$ ratio | 5.5 | 4.0 | 2.7 | 1.3 | 0.7 |

Although product concentrations of $CS_2$ increased slightly above those shown in Comparison Example 1, the equilibrium concentration of $CS_2$ had not yet been approached.

COMPARISON EXAMPLE 3

Similar to comparison Example 2 except for the fact that the temperature was increased to above 1090° C.

| Feed Gas | COS | COS | COS | COS | COS |
|---|---|---|---|---|---|
| Temp. °C. | 1070 | 1040 | 1030 | 1120 | 1110 |
| Superficial Vel. m/sec | 0.06 | 0.06 | 0.04 | 0.07 | 0.04 |
| Contact time - sec. | 4.4 | 8.5 | 12.7 | 8.0 | 12.0 |
| Product Gases - mole % | | | | | |
| $H_2$ | trace | trace | trace | trace | trace |
| $O_2$ | 0.04 | 0.19 | 0.19 | 0.11 | 0.06 |
| $N_2$ | 0.71 | 2.23 | 3.37 | 1.06 | 1.38 |

-continued

| | | | | | |
|---|---|---|---|---|---|
| CO | 70.74 | 61.99 | 66.68 | 58.05 | 59.34 |
| $CO_2$ | 0.73 | 0.11 | 0.15 | 0.22 | 0.13 |
| COS | 11.20 | 6.17 | 4.28 | 12.08 | 9.50 |
| $H_2S$ | 0.58 | 5.65 | 4.13 | 0.73 | 0.80 |
| $CS_2$ | 16.00 | 23.66 | 21.20 | 27.75 | 28.79 |
| $COS/CS_2$ ratio | .70 | .26 | .20 | .43 | .32 |

Thus, elevated temperatures lead to increased $CS_2$ product concentration, though not necessarily to predicted equilibrium concentration.

EXAMPLE 1

This example illustrates the effect of varying the S/O ratio.

| Feed Gas | COS | COS | COS | COS | COS | COS | $COS + S_2$ | $COS + S_2$ |
|---|---|---|---|---|---|---|---|---|
| Feed S/O atom ratio | 1.0 | 1.0 | 1.0 | 1.0 | 1.0 | 1.0 | 2.0 | 2.0 |
| Temp. °C. | 1040 | 1025 | 1122 | 1109 | 1098 | 1070 | 1072 | 1095 |
| Superficial Vel. m/sec | 0.06 | 0.04 | 0.06 | 0.04 | 0.08 | 0.06 | 0.06 | 0.08 |
| Contact time - sec | 8.0 | 11.9 | 7.6 | 11.1 | 6.4 | 8.0 | 8.0 | 6.4 |
| Product gases - mole % | COS | COS | COS | COS | COS | COS | $COS + S_2$ | $COS + S_2$ |
| $H_2$ | | | | ←trace→ | | | | |
| $O_2$ | 0.19 | 0.19 | 0.11 | 0.06 | 0.04 | 0.02 | 0.00 | trace |
| $N_2$ | 2.23 | 3.37 | 1.06 | 1.38 | 1.19 | 0.93 | 3.09 | 6.09 |
| CO | 61.99 | 66.68 | 58.05 | 59.34 | 52.40 | 50.97 | 32.26 | 41.70 |
| $CO_2$ | 0.11 | 0.15 | 0.22 | 0.13 | 1.23 | 0.86 | 0.64 | 0.68 |
| COS | 6.17 | 4.28 | 12.08 | 9.50 | 25.69 | 21.60 | 26.38 | 24.61 |
| $H_2S$ | 5.65 | 4.13 | 0.73 | 0.80 | 0.00 | 0.00 | 0.43 | 0.00 |
| $CS_2$ | 23.66 | 21.20 | 27.75 | 28.79 | 19.45 | 25.62 | 37.20 | 26.92 |

Thus, at a bed temperature of 1072° C., increasing the S/O ratio to 2.0 increases the $CS_2$ product concentration to 37%.

EXAMPLE 2

Similar to Example 1, the S/O ratio was kept constant at 2.0 by using oxygen plus sulfur vapor as the feed gas.

| Temp °C. | 984 | 1012 | 1035 | 1066 | 955 | 953 | 876 | 832.5 |
|---|---|---|---|---|---|---|---|---|
| Superficial Velocity m/sec | 0.05 | 0.05 | 0.06 | 0.06 | 0.05 | 0.05 | 0.05 | 0.04 |
| Contact Time/sec | 9.3 | 9.3 | 8.8 | 8.8 | 9.8 | 9.8 | 10.4 | 11.1 |
| Product Gases - Mole % | | | | | | | | |
| $H_2$ | 1.8 | trace | 0.58 | 0.96 | trace | trace | trace | trace |
| $O_2$ | 0.15 | 0.15 | 0.15 | 0.13 | 0.08 | 0.08 | 0.10 | 0.13 |
| $N_2$ | 5.53 | 5.95 | 6.30 | 4.59 | 3.16 | 0.54 | 0.65 | 10.77 |
| CO | 1.42 | 0.70 | 2.14 | 3.62 | 11.21 | 15.28 | 10.36 | 5.30 |
| $CO_2$ | 35.15 | 41.18 | 38.33 | 28.45 | 13.24 | 3.21 | 6.96 | 23.24 |
| COS | 3.87 | 3.93 | 7.35 | 9.61 | 27.43 | 41.99 | 50.13 | 45.49 |
| $H_2S$ | 20.22 | 7.35 | 10.61 | 12.20 | 2.08 | 2.56 | 5.71 | 2.53 |
| $CS_2$ | 32.48 | 40.74 | 34.54 | 40.44 | 42.72 | 36.34 | 26.09 | 12.54 |
| $SO_2$ | 0.00 | 0.00 | 0.00 | 0.00 | 0.00 | 0.00 | 0.00 | 0.00 |
| $CS_2$ Rate of Formation kg/hr - ft³ | 10.32 | 12.45 | 11.23 | 11.14 | 9.23 | 8.64 | 5.07 | 1.81 |

The results of these experiments are summarized in FIG. 1A in which it can be seen that the predicted equilibrium concentrations of $CS_2$ in the product gas are approached when the temperature is at 1036° C., atmospheric pressure is used and the S/O concentration is 2.0. Also, it can be seen that $S_2$ and $O_2$ are better feedstocks, that is sources of S and O, than $SO_2$ or COS.

Although 1 atmosphere is the preferred pressure at which the reaction is run, pressures ranging from about 1 to about 15 atmospheres can be used.

Similarly, other considerations may govern the choice of S/O ratio to be employed. Heat balance calculations, performed in a manner well known to those skilled in the art, showed that a reaction temperature of about 1036° C. can be maintained (14 percent reaction heat loss assumed) when the sulfur feed is in the liquid state at a S/O ratio of 1, while at a S/O ratio of 2, the sulfur must be fed as a superheated vapor in order to maintain the reactor at 1036° C. In the preferred embodiment of this invention, S/O ratios ranging from about 1.0 to about 2.0 can be used depending upon economic considerations and the degree of adaptation desired in the reaction vessel.

The temperature at which the reaction vessel is maintained can range from about 870° C. to about 1092° C., preferably from about 995° C. to about 1064° C. One surprising advantage of the present system over existing systems is that it is possible to easily maintain a constant temperature due to the use of a single zone fluidized bed.

The superficial velocity employed in the reaction of the present invention is, of course, dependent upon the particular reaction vessel used and the other considerations such as the rate of product formation desired, reactants employed, etc. The superficial velocity employed in the present invention can range from about 0.03 to about 0.5, preferably from about 0.05 to about 0.4 meter per second.

The contact time can range from about 3.5 to about 20, preferably from about 4.0 to about 15 seconds.

FIG. 2 illustrates a process scheme illustrating the present invention. It is to be understood that this is a non-limiting example and that variations can easily be seen by those skilled in the art.

Referring to FIG. 2, a carbon source 1 is fed to a milling apparatus 20. Within milling apparatus 20, carbon source 1 is converted to carbon stream 1a containing carbon particles of a size ranging from about 60 mesh to about 200 mesh. Carbon stream 1a then flows to hopper 21.

From hopper 21, carbon stream 1a is then fed to reaction vessel 22. Reaction vessel 22 is comprised of any suitable material including steel, stainless steel or the like.

Since the reaction is being run at above the vaporization temperature of sulfur (445° C.), the sulfur is present in the form of a superheated vapor wherein the sulfur is persent in the form of polyatomic ($S_8$) molecules. The presence of these polyatomic sulfur molecules presents severe corrosion problems, thus, the interior 23 of reaction vessel 22 is lined with any suitable material capable of withstanding the high temperatures generated during the reaction and also capable of withstanding the corrosive effects of the sulfur used in the reaction. Examples of such suitable materials include refractory ceramics, zirconia, mullite, and high melting point alumina.

In a preferred embodiment of the present invention, a carbon source 1 or its respective carbon stream 1a is mixed with sulfur 2 and oxygen, or oxygen containing gas 3. From FIG. 2, it can be seen that oxygen, or oxygen containing gas 3 flows to reaction vessel 22 from gas source 24. Gas source 24 may be a source of pure oxygen or it may be a source of a gas containing by weight about 90% of oxygen and also containing, in addition to oxygen, about 10% by weight of other gases such as, for example, nitrogen.

Sulfur 2, from sulfur source 25, enters sulfur melter 26 which can be any conventional sulfur melter. Molten sulfur 2a then flows from sulfur melter 26 to a sulfur vaporizer 27, such as a Selas furnace or the like.

Sulfur 2, now, for illustrative purposes, in the form of sulfur vapor 2b, enters the interior 23 of reaction vessel 22. It is also within the scope of the present invention to premix oxygen containing gas 3 and sulfur 2 in a common conduit 15 leading into reaction vessel 23. Within the interior 23 of reaction vessel 22, the carbon source 1, oxygen or oxygen containing gas 3 and sulfur 2 all act in conjunction to achieve the proper fluidized state within the reaction vessel. The parameters defining the proper fluidized state to be achieved will, of course, vary with the particular application for which the apparatus is intended. For example, a particularly useful industrial application would be an apparatus designed to produce approximately 500 tons/day (T/D) of carbon disulfide. In such an apparatus, the conditions within the interior 22 of reaction vessel 23 would be, for example, 1036° C., 100 psig, and a superficial velocity of 0.75 ft/sec (0.22 m/sec). Under these conditions, a mixture of gases is formed.

Under the previously mentioned reaction conditions within the interior 23 of reaction vessel 22, carbon 1, oxygen or oxygen containing gas 3, and sulfur 2 react to form exit stream 31 containing, for illustrative purposes, 39.5% carbon monoxide (CO), 38.9% carbon disulfide ($CS_2$), 12.7% carbonyl sulfide (COS), 2% hydrogen sulfide ($H_2S$), 6.9% unreacted sulfur vapor ($S_2$) and some entrained coke and ash.

Exit stream 31 containing the mixture of gases as previously described flows from reaction vessel 22 to cyclone separators 32, 32a to remove any solids. Cyclone separators 32, 32a may be of any suitable type well known to those skilled in the art. Cyclone separators 32, 32a may be lined with a suitable material such as a refractory ceramic.

Exit stream 31 now flows from cyclone separators 32, 32a to sulfur quench unit 33. The quenching step within sulfur quench unit can take place by any number of means with one embodiment being to use the sulfur source 25 as a quenching mechanism. In this embodiment, sulfur 2 from sulfur source 25 flows to sulfur melter 26 where it is converted to liquid sulfur 2a. Liquid sulfur 2a then flows to sulfur tank 34, to sulfur pump 35 which then pumps liquid sulfur 2a through pressure leaf filter 36 and then to sulfur quench unit 33.

Sulfur quench unit 33 may be of any suitable type with one preferred example being the spray type. In the particular industrial application described above, the temperature of the exit stream 31 containing the mixture of gases as previously described is reduced from about 1036° C. to about 650° C. within sulfur quench unit 33. Also within sulfur quench unit 33, from about 85% to about 95% of the CO is converted to COS during a retention time ranging from about 3 to about 10 seconds. Since the temperature of exit stream 31 is now lowered, sulfur quench unit 33 may be comprised of any suitable material capable of withstanding the lower temperatures such as, for example, stainless steel. In addition, the interior of quench unit 33 may also be lined with a refractory material.

The quenched gas stream 31a now containing, for illustrative purposes, from about 1% to about 5% CO, from about 15% to about 30% $CS_2$, from about 25% to about 40% COS, from about 0.5% to about 3% $H_2S$ and from about 30% to about 45% $S_2$ flows from quench unit 33 to sulfur condenser 37. Sulfur condenser 37 has a heat load adaptable to the system within which it is employed. The effluent mixture of gas plus liquified sulfur 31b flows from sulfur condenser 37 to sulfur storage tank 34.

Gas stream 31c now containing from about 2% to about 7.5% CO, from about 35% to about 42% $CS_2$, from about 40% to about 55% COS and from about 1.0% to about 3.0% $H_2S$ flows from sulfur storage tank 34 to a $CS_2$ scrubbing system 38. $CS_2$ scrubbing system 38 may be any one well known to those skilled in the art and can be comprised of, for example, a $CS_2$ scrubber 39, a $CS_2$ condenser 40, a stabilizer feed tank 41, a $CS_2$ absorber 42, a $CS_2$ stripper 43, a heat exchanger 44, a lens oil storage tank 45, and a stripper condenser 46.

Effluent gas 31d from the $CS_2$ absorber 42 flows to gas fired heater 47 where gas temperature are increased from about 37° C. to about 450° C. From gas fired heater 47, gas 31e flows into catalytic disproportionation reactor 48 containing an appropriate catayst such as alumina or bauxite. In catalytic disproportionation reactor 48, COS is converted to $CS_2$ so that the effluent gas stream 31f contains CO, $CS_2$, $CO_2$, COS and $H_2O$. From catalytic disproportionation reactor 48, gas 31f flows through heat exchanger 49 where the temperature is lowered.

It would also be obvious to one skilled in the art that the recovery system may also be designed so that effluent gas stream 31c from sulfur tank 34 can be heated and then flow directly to catalytic disproportionation reactor 48 and then the effluent gases from catalytic disproportionation reactor 48 would then flow to heat exchanger 49 where the temperature would be lowered. Gases leaving heat exchanger 49 would then be cycled through the $CS_2$ recovery train.

In the embodiment illustrated in FIG. 2, the effluent gas 31g leaving heat exchanger 49 flows into another $CS_2$ absorber 50 where $CS_2$ is removed in a lean oil. The lean oil/$CS_2$ mixture is pumped from $CS_2$ absorber 50 to heat exchanger 44 and $CS_2$ stripper 43 previously described.

The $CS_2$ in stablizer feed tank 41 can then be pumped to the $CS_2$ recovery system comprising, for example, a $CS_2$ stabilizer 51, a $CS_2$ still 52 and a caustic wash tower 53.

Effluent gas 31h from $CS_2$ absorber 50 containing CO, COS, $CO_2$ and $H_2S$ is allowed to flow to the reaction unit 54, which may be a Claus unit, where a portion of the COS is burned to form SO₂ and CO₂. The SO₂ is further reacted in the reaction unit 54 with the remaining COS to form CO₂ and S₂. Sulfur is recovered and recycled to both the sulfur vaporizer 27 and the sulfur tank 34. Effluent gases flow from reaction unit 54 to an absorber 56, to an incinerator 56 and out the stack 57.

Figure 3:
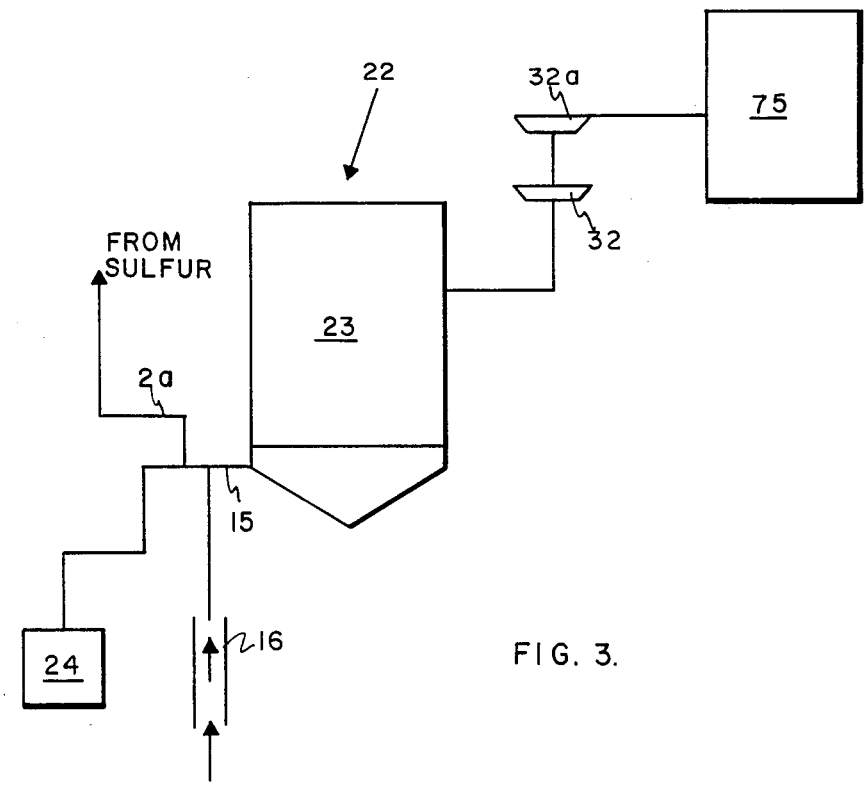
FIG. 3 represents a modification of the present invention which can be used for the one step production of hydrogen sulfide.

In another embodiment of the present invention, hydrogen sulfide can be produced in a one step process by modifying reaction vessel 22 so as to allow the introduction of a source of hydrogen to the reaction bed. In this embodiment, as illustrated in FIG. 3, the source of hydrogen may be introduced through a valve or pipe 16 into common conduit 16 leading into reaction vessel 22. The system is then modified so that a hydrogen sulfide recovery system 75, well known to those skilled in the art, is then used to recover the hydrogen sulfide. The results of such a modification are summarized in Example 3.

EXAMPLE 3

Similar to Example 2 except that the reaction was further modified to allow the addition of steam to the reaction vessel to provide one step formation of $H_2S$.

| Feed - Mole Ratio $S_2^*:O_2:H_2O$ | ←1:1:2→ | | | | | |
|---|---|---|---|---|---|---|
| Superficial Vel. - m/sec | 0.06 | 0.07 | 0.06 | 0.06 | 0.06 | 0.05 |
| Temp. - °C. | 873 | 932 | 814 | 759 | 693 | 653 |
| Product Gases - Mole % | | | | | | |
| $H_2$ | 2.03 | 4.44 | 2.86 | 1.66 | 0.58 | 0.39 |
| $O_2$ | 0.06 | 0.04 | 0.06 | 0.06 | 0.13 | 0.10 |
| $N_2$ | 3.52 | 3.00 | 3.42 | 3.10 | 5.50 | 5.63 |
| CO | 11.65 | 29.32 | 4.18 | 1.08 | 0.44 | 0.14 |
| $CO_2$ | 24.83 | 10.65 | 39.99 | 45.18 | 56.41 | 56.70 |
| COS | 22.59 | 16.15 | 9.94 | 4.82 | 4.37 | 2.57 |
| $H_2S$ | 33.29 | 32.26 | 39.18 | 43.96 | 31.71 | 34.37 |
| $CS_2$ | 2.03 | 4.14 | 0.37 | 0.14 | 0.86 | 0.10 |
| $SO_2$ | 0.00 | 0.00 | 0.00 | 0.00 | 0.00 | 0.00 |
| $CH_4$ | 0.00 | 0.00 | 0.00 | 0.00 | 0.00 | trace |

*all the sulfur in the feed is treated as $S_2$ for feed ratio and gas velocity determination.

This example indicates that $H_2S$ can be made in a single step process.

Further features of the preferred and most preferred embodiments of the invention can be found in the claims hereinafter.

What is claimed is:

1. An autothermal process for the production of carbon disulfide from a carbonaceous material and elemental sulfur which comprises reacting the carbonaceous material with an oxygen-containing gas and elemental sulfur in a one-step process in a fluid bed so as to autogenously generate the temperatures necessary for the reaction of the carbonaceous material with elemental sulfur.

2. The process according to claim 1 wherein the oxygen-containing gas and sulfur are present at a S/O atom ratio of about 2:1.

3. A process according to claim 1 wherein the carbonaceous material is petroleum coke.

4. An autothermal process for the continuous production of carbon disulfide from a carbonaceous material and elemental sulfur which comprises reacting the carbonaceous material with an oxygen-containing gas and elemental sulfur in a one-step process in a fluid bed to autogenously generate the temperatures necessary for the reaction of the carbonaceous material with elemental sulfur.

5. A process according to claim 4 wherein the oxygen-containing gas and sulfur are present in a S/O atom ratio of about 2:1.

6. An autothermal process for the production of hydrogen sulfide from a carbonaceous material and elemental sulfur which comprises reacting the carbonaceous material with an oxygen-containing gas and elemental sulfur in a one-step process in a fluid bed to autogenously generate the temperatures necessary for the reaction of the carbonaceous material with elemental sulfur and introducing a source of hydrogen into the reaction vessel.

7. A process according to claim 6 wherein the oxygen-containing gas and sulfur are present in a S/O atom ratio of about 2:1.

* * * * *

UNITED STATES PATENT AND TRADEMARK OFFICE
CERTIFICATE OF CORRECTION

PATENT NO. : 4,695,443
DATED : September 22, 1987
INVENTOR(S) : Albert M. Leon

It is certified that error appears in the above-identified patent and that said Letters Patent are hereby corrected as shown below:

Col. 8, line 35 - "lens" should be --lean--;

Col. 9, line 6 - "56" should be --55--;

Col. 9, line 14 - "16" should be --15--.

Signed and Sealed this

First Day of March, 1988

*Attest:*

DONALD J. QUIGG

*Attesting Officer*  *Commissioner of Patents and Trademarks*